(12) United States Patent
Inoue

(10) Patent No.: US 6,860,515 B2
(45) Date of Patent: Mar. 1, 2005

(54) CONNECTOR CLIP FOR VERIFYING COMPLETE CONNECTION

(75) Inventor: Tomoki Inoue, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/302,238

(22) Filed: Nov. 22, 2002

(65) Prior Publication Data

US 2003/0094809 A1 May 22, 2003

(30) Foreign Application Priority Data

Nov. 22, 2001 (JP) .......................................... 2001-358598
Nov. 18, 2002 (JP) .......................................... 2002-334427

(51) Int. Cl.[7] .......................... F16L 35/00; F16L 43/00
(52) U.S. Cl. .......................... 285/93; 285/81; 285/921; 285/179
(58) Field of Search .............................. 285/81, 87, 88, 285/93, 305, 313, 319, 921, 179

(56) References Cited

U.S. PATENT DOCUMENTS

| | | | | |
|---|---|---|---|---|
| 2,343,755 A | * | 3/1944 | Dougherty .................... | 285/45 |
| 2,509,925 A | * | 5/1950 | Ison ............................. | 285/87 |
| 3,853,148 A | * | 12/1974 | De Vincent et al. ........ | 138/110 |
| 4,230,109 A | * | 10/1980 | Geiss ........................... | 604/533 |
| 4,616,859 A | * | 10/1986 | Brunet ........................ | 285/317 |
| 5,248,306 A | * | 9/1993 | Clark et al. .................. | 604/537 |
| 5,658,020 A | * | 8/1997 | Carman et al. ............... | 285/81 |
| 5,957,894 A | * | 9/1999 | Kerwin et al. .............. | 604/178 |
| 6,290,264 B1 | | 9/2001 | Inoue | |
| 6,318,762 B2 | | 11/2001 | Inoue | |
| 6,409,223 B1 | * | 6/2002 | Bartholoma ................. | 285/114 |
| 6,601,878 B2 | * | 8/2003 | Ooi et al. ..................... | 285/93 |
| 6,612,619 B2 | * | 9/2003 | Wieder ........................ | 285/23 |

FOREIGN PATENT DOCUMENTS

| | | |
|---|---|---|
| JP | 06-323483 | 11/1994 |
| JP | 09-269088 | 10/1997 |
| JP | 11-006591 | 1/1999 |

* cited by examiner

Primary Examiner—James M. Hewitt
(74) Attorney, Agent, or Firm—Andrus, Sceales, Starke & Sawall, LLP

(57) ABSTRACT

A connector clip integrally comprises a holder portion and a C-shaped clamp on one longitudinal end portion of the holder portion. The holder portion is mounted to a length from a connector to a curved portion of a pipe. The C-shaped clamp clips a tube connected to a tube connecting portion of the connector. The holder portion comprises a holding portion to hold a length from a tubular holder portion of the connector to an annular projection of the pipe therein, a first receiving portion formed on an opposite longitudinal side from the holding portion to receive a straight pipe portion of the pipe, and a second receiving portion formed on an opposite longitudinal side from the first receiving portion to receive a curved portion of the pipe.

4 Claims, 12 Drawing Sheets

CONNECTOR CLIP FOR VERIFYING COMPLETE CONNECTION

BACKGROUND OF THE INVENTION

The present invention relates to a connector clip adapted to verify that a complete connection has been made between a connector used in a connecting portion of a piping such as a fuel piping of a vehicle, and a pipe inserted into the connector, or adapted to prevent an incomplete fitting or connection therebetween.

In a fluid piping structure where a pipe is connected to a tube, a connector is used for connecting the pipe to the tube. In such piping system, for example, the pipe is formed with an annular engagement projection on one axial end of an outer peripheral surface thereof, and the connector is configured with a retainer to be fitted in a pipe inserting portion thereof. Then, the pipe is inserted into the retainer so that the annular engagement projection snap-engages with one axial end portion of the retainer providing a stop mechanism that prevents the pipe from coming off the connector, and consequently, the pipe is completely connected to the connector. If an operator does not take care sufficiently to complete connection between the pipe and the connector, the pipe might not be fully inserted into the retainer and the annular engagement projection of the pipe might not snap-engage with one axial end portion of the retainer, or the retainer might not be fitted properly in the pipe inserting portion of the connector. That is, the pipe might be in a half-fitting relation with respect to the connector.

Meanwhile within a connecting portion between a connector and a pipe, a sealing member or members are disposed to prevent an internal fluid from leaking out. However, in case of a piping system subject to operation while the pipe is incompletely connected to the connector, usually sealing property by the sealing member between the connector and the pipe becomes lowered, and an internal fluid leaks out. In view of the foregoing aspect, it is preferred to supply a mechanism for preventing an incomplete connection between a connector and a pipe in order not to subject a piping system to operation while the pipe is not fully inserted into the retainer, or the retainer does not properly fit in the connector.

Further, for example, in case that a resin tube connected to a connector leads to a gasoline engine of a vehicle, as the connector constantly moves rotationally at a small angle relative to a pipe by vibration transmitted from the gasoline engine via the resin tube to the connector, a sealing member or members disposed between the connector and the pipe becomes thereby worn, and thus sealing property is lowered therebetween. Therefore, a piping configured by connecting a pipe to a connector, or a connecting portion between a pipe and a connector is preferably provided with a block mechanism against rotation in order to restrain relative rotational movement of the connector with respect to the pipe.

Accordingly, an arrangement as shown in FIG. 12 is offered to check easily whether a pipe is completely inserted into and fitted in a connector. In the arrangement, a pipe A is provided with an annular projection B thereon so as to be located outside a connector C, and a clip D, for example, of a type as disclosed in JP, A, 11-6591 is mounted onto the connector C and the pipe A. Further, a clamp E is disposed onto one end portion F of a bracket G which is fixed to a vehicle body (not shown) on an opposite end portion H thereof, and the clamp E clips a connecting section or there around of a resin tube I connected to the connector C to prevent rotational movement of the connector C with respect to the pipe A.

However, if the bracket G is formed short, a vehicle mechanical layout often does not allow the opposite end portion H thereof to reach and fix to a vehicle body. Thus, it may not a rare case that the bracket G should be formed considerably elongate. But, as the bracket G is formed longer, an amount of deformation resulted from deflection between one end portion F and the opposite end portion H of the bracket G becomes larger, and as a result, function of restraint against rotational movement of the bracket G is lowered. Then, such restraint member against rotational movement as disclosed in JP, A, 9-269008 is applied. This restraint member is mounted onto a connector, wherein one end portion thereof clips flat portions formed in diametrical opposite portions of an outer peripheral surface of the connector respectively, and a U-shaped opening formed on an opposite end portion thereof receives a portion of a pipe extending in a curved manner with respect to an axis of the connector. The restraint member with this arrangement can be configured relatively compact, and thereby provides a function to restrain from rotational movement with high accuracy.

As this restraint member is, however, configured to clip the outer peripheral surface of the connector, it is difficult to use the restraint member along with a clip for verifying complete connection or fitting between the pipe and the connector. Even if a restraint member is configured to be used along therewith, an operator has to mount the clip and the restraint member onto the connector separately. That bothers the operator.

SUMMARY OF THE INVENTION

Accordingly, it is an object of the present invention to provide a connector clip not only having a checking function to easily verify that a pipe is fully inserted and fitted in a connector, but also having a lock function precisely preventing relative rotational movement of the connector with respect to the pipe In order to achieve the aforementioned object, there is provided a novel connector clip for verifying connection between a connector for a fluid path and a pipe inserted in and snap-engaged with the connector. The connector clip is applied to be mounted to the connector and the pipe. The connector is formed with a tube connecting portion on one axial end thereof, and with a pipe inserting portion on an opposite axial end thereof, or at least on an opposite axial end thereof. The pipe is inserted into an opening on one end of the pipe inserting portion for snap-fit in the connector or the pipe inserting portion. The pipe comprises a straight pipe portion inserted into the opening of the pipe inserting portion and extending axially outwardly from the opening, and a curved portion formed or disposed on an opposite axial end of the straight pipe portion. The pipe or the straight pipe portion inserted into the pipe inserting portion is sealed by a sealing member or members with respect to an inner surface of the pipe inserting portion The straight pipe portion is provided with an annular projection on an outer peripheral surface thereof, so as to be located axially outwardly from the opening of the pipe inserting portion.

The connector clip comprises integrally a mounting portion or a mounting body, a connector connecting portion in engagement with the tube connecting portion of the connector or with a tube connected to the tube connecting portion, and a pipe connecting portion for receiving the curved portion of the pipe. The mounting portion includes a holding portion and a straight pipe receiving portion formed or disposed on an opposite longitudinal end of the holding portion. The holding portion is adapted to hold a length of the connector and the pipe from the pipe inserting portion to the annular projection on the straight pipe portion. The straight pipe receiving portion is adapted to fit on and receive an opposite end portion or end of the straight pipe portion extending axially from the annular projection, but is constructed so as not to fit on and receive the annular projection. The connector connecting portion engages with or is connected to the tube connecting portion of the connector or the tube, in co-rotatable relation therewith, and the pipe connecting portion receives or is connected to the curved portion of the pipe in co-rotatable relation therewith. The connector clip may be made of resin, a pipe may be made of metal, and a connector may be made of resin or metal. Typically, an annular engagement projection is formed on an outer peripheral surface of the straight pipe portion of the pipe, on one axial end or an insertion end of the annular projection, then, a retainer is fitted in the pipe inserting portion of the connector, or fitted on an outer periphery of the pipe inserting portion of the connector, for example, releasably. And, on the occasion of connecting the pipe and the connector, the straight pipe portion of the pipe is inserted in the pipe inserting portion or in the retainer so that the annular engagement projection is snap-engaged with the retainer or one axial end portion of the retainer. On the occasion of release of connection therebetween, for example, the retainer in engagement with the pipe is relatively pulled out of the connector, or engagement between the retainer and the pipe is released by means of a release tool or by deforming of the retainer, and the pipe only is relatively pulled out of the connector. The connector has the tube connecting portion on one axial end and the pipe inserting portion on an opposite axial end. Any connector provided with a tube connecting portion at one axial end portion of a pipe inserting portion thereof falls into the concept of the connector of the present invention. Also, a tube connecting portion of the present invention means any connecting portion of various members being connected to the pipe.

The holding portion of the mounting body holds the length of the connector and the pipe from the pipe inserting portion to the annular projection of the straight pipe portion, without clearance, with a close clearance or with an appropriate clearance longitudinally (in axial direction of the pipe inserting portion of the connector, or the straight pipe portion of the pipe). Thus, typically, the connector and the pipe is axially connected in the holding portion in a locking relation against release movement therebetween. For example, the holding portion holds the length of the connector and the pipe from a step portion formed on an outer surface of the pipe inserting portion to the annular projection of the straight pipe portion.

In an incomplete connection or a half-fitting between the pipe and the connector, i.e., in case that the pipe is not completely or fully inserted in the pipe inserting portion of the connector (for example, in case that the annular engagement projection of the pipe is not engaged with the retainer), the annular projection of the pipe is located away from the pipe inserting portion of the connector, compared to the annular projection located during complete connection or fitting between the pipe and the connector. In this state, a distance from the pipe inserting portion to the annular projection is longer. If the connector clip is tried to be mounted onto the connector so that the pipe inserting portion is located in the holding portion, the annular projection is located axially or longitudinally outwardly away from the holding portion on the straight pipe receiving portion, for example, provided continuously from the holding portion on an opposite longitudinal end of the holding portion. As the straight pipe receiving portion is, however, formed not to fit on the annular projection, the mounting body cannot be mounted to the pipe inserting portion of the connector or the straight pipe portion of the pipe. That enables to check that connection between the connector and the pipe is not made completely.

In order to form the straight pipe receiving portion in simple configuration, preferably, the straight pipe receiving portion is provided with a straight pipe portion slot extending longitudinally for receiving the straight pipe portion of the pipe. And the straight pipe portion slot is formed to receive an opposite end portion or end of the straight pipe portion extending axially from the annular projection, and preferably a width thereof is sized smaller than an outer diameter of the annular projection of the pipe. For example, the straight pipe portion slot is formed with an opening extending longitudinally, and the straight pipe portion of the pipe is fitted and received therein via the opening. The width of the opening may be sized smaller than an outer diameter of the annular projection of the pipe. The straight pipe portion slot is, for example, formed to be continued from the holding portion.

The connector connecting portion of the connector clip engages with the tube connecting portion of the connector or with the tube connected to the tube connecting portion, so that the connector clip moves rotationally along with the connector when, or provided that the connector is rotationally moved. And also, the pipe connecting portion receives the pipe, so that the connector clip moves rotationally along with the pipe when, or provided that the pipe is rotationally moved. That is, the pipe is connected to the connector via the connector clip not to move rotationally relatively with respect to the connector. In the present invention, the pipe includes the straight pipe portion, and the curved portion disposed or formed on an opposite axial end of the straight pipe portion. The pipe connecting portion of the connector clip receives the curved portion or a portion of the pipe extending from the curved portion in co-rotatable relation. Thus configured structure of receiving the curved portion of the pipe in the pipe connecting portion enables to simplify a shape or a configuration of the connector clip with lock function against rotation and to construct the connector clip which can be easily connected to the pipe.

The pipe connecting portion of the connector clip may be formed therein with a curved portion slot continued to the straight pipe portion slot, integrally on an opposite longitudinal end of the straight pipe receiving portion. The curved portion slot fits on and receives the curved portion of the pipe, thereby the connector clip or the pipe connecting portion receives the curved portion or the pipe in co-rotatable relation with one another. In such configuration, the straight pipe receiving portion and the pipe connecting portion fits on and receives an opposite end portion or end of the straight pipe portion extending axially from the annular projection and the curved portion continuously. Therefore, for example, if the straight pipe portion slot and the curved portion slot are constructed to radially clip the pipe, or to receive the pipe by snap-fit thereonto, the connector clip can be firmly connected to the pipe.

By the way, a connector clip for verifying complete connection is preferably formed in as thin-wall configuration as possible, for lightness. However, if a straight pipe receiving portion is formed in thin-wall, a resistance to widening deformation or movement of the straight pipe portion slot is lowered, and the straight pipe portion slot tends to be easily widened. Further, typically an annular projection of a pipe is sized somewhat larger than a pipe, but not much larger than the pipe. Thus, when the annular projection of the pipe in incomplete fitting relation with a connector is strongly pushed into an opening of the straight pipe portion slot with thin-wall configuration, the straight pipe portion slot might be widen enough for the annular projection to fit therein. As a result, an incomplete connection between the pipe and the connector is not verified. In order to avoid such case, the straight pipe portion slot may be formed narrow, or a fiber reinforced resin may be applied to the connector clip to provide rigidity therewith.

However, as in the case above, the pipe may not be fitted in the straight pipe portion slot smoothly, or the connector clip may not be easily mounted onto the connector. Especially, if a connector clip having a number of fit-engagement portions, or a wide range of fit-engagement portions are made of a fiber reinforced resin material, a working efficiency for mounting of the connector clip will be considerably lowered. Therefore, it is effective to provide integrally one or a plurality of reinforcing ribs extending in a circumferential direction around an outer surface of the straight pipe receiving portion, in order to enhance resistance to widening deformation or movement of the straight pipe portion slot. For example, a plurality of reinforcing ribs are disposed in longitudinally spaced relation each other. This configuration provides sufficient resistance to widening deformation or movement to block the annular projection of the pipe against fitting in the straight pipe portion slot of the straight pipe receiving portion with thin-wall, or relatively thin-wall configuration, and a favorable or relatively favorable working efficiency for mounting of the connector clip. In order to enhance reinforcing effectiveness of the reinforcing rib, a protruding or projecting portion such as a frame portion or an edge portion is formed so as to protrude or project laterally outwardly at an opening of the straight pipe portion slot, and the reinforcing rib is formed so as to extend from one end of the projecting portion to an opposite end of the projecting portion.

A piping connecting structure is constructed by a connector, a tube connected to a tube connecting portion of the connector, a pipe inserted and fitted in a pipe inserting portion of the connector and a connector clip. A connector clip of the present invention has not only a function to prevent incomplete connection or a half-fitting between a connector and a pipe, but also a function to restrain relative rotation of the connector and the pipe. Thus, the connector clip of the present invention serves to effectively prevent such inconveniences that a piping system is under operation wherein the pipe has not been connected with the connector completely, and that sealing property between the connector and the pipe is deteriorated as a sealing member is worn. And the connector clip of the present invention can be integrally molded as a single unit, and can be easily mounted onto the connector and the pipe. This results in cost saving for piping.

Now, the preferred embodiments of the present invention will be described in detail with reference to the drawings.

DETAILED DESCRIPTIONS OF PREFERRED EMBODIMENTS

Figure 1:
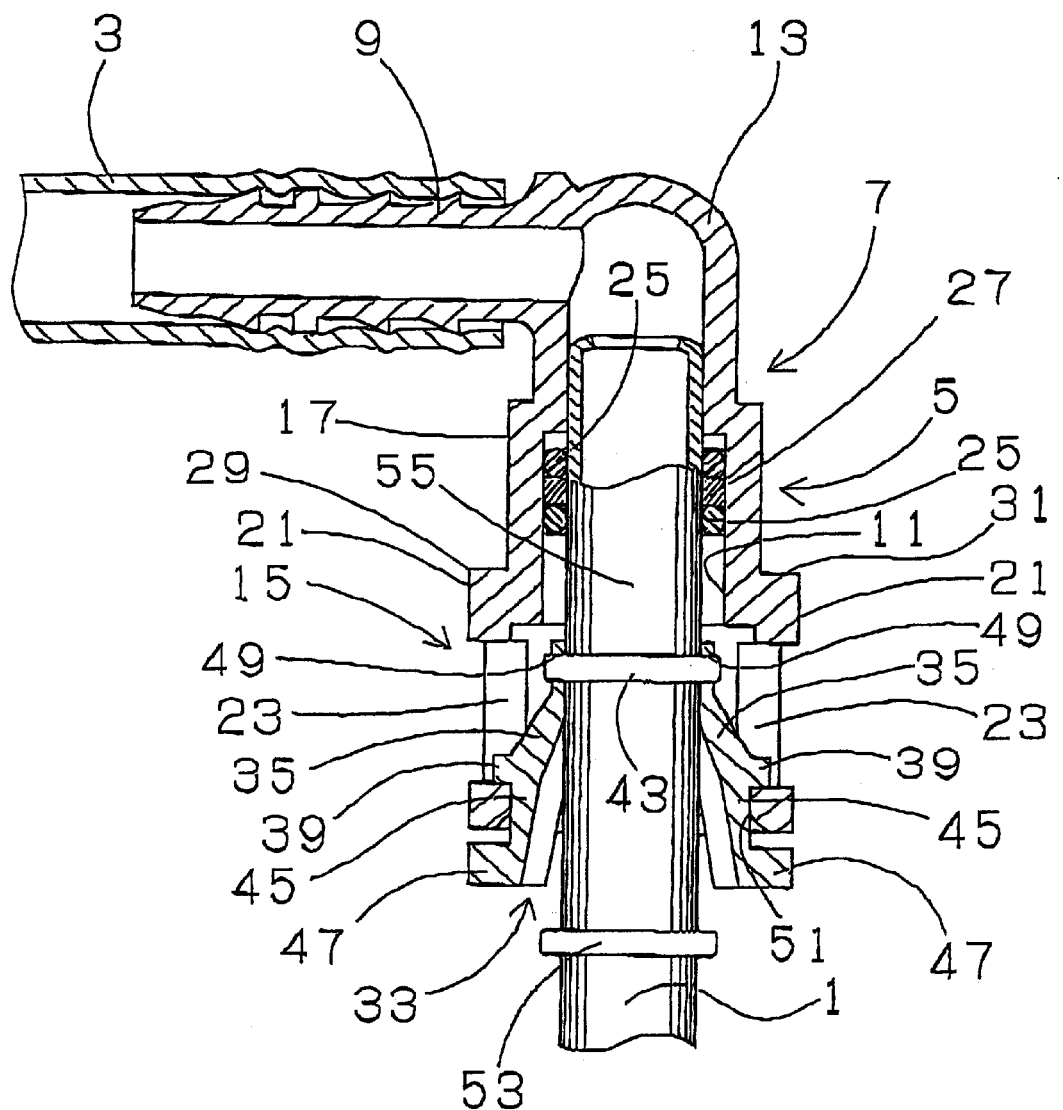
FIG. 1 is a sectional view of a connecting portion in a piping onto which a connector clip of the present invention is to be mounted.

As shown in FIG. 1, a gasoline fuel piping for vehicle is constructed by connecting a metallic pipe 1 with a resin tube 3. A connector 5 made of glass fiber reinforced polyamide (PA/GF) is applied to construct a connecting portion between the pipe 1 and the resin tube 3 in the piping, wherein the resin tube 3 is fittingly connected to the connector 5 on one axial end thereof, and then the pipe 1 is fittingly inserted into an opposite axial end of the connector 5. The connector 5 comprises a pipe inserting portion 7, and a resin tube connecting portion 9 which is formed integrally on one axial end portion of the pipe inserting portion 7 in connected state. The resin tube connecting portion 9 is extending in a curved manner (in a curved manner at right angle in this embodiment) from one axial end portion of the pipe inserting portion 7 or is disposed at an angle (at 90° or transversely in this embodiment) with respect to the pipe inserting portion 7, and a bore 11 is provided in the connector 5 through from an opposite axial end (rear end) of the pipe inserting portion 7 to one axial end (leading end) of the resin tube connecting portion 9. The resin tube 3 is tightly fittingly connected to an outer periphery of the resin tube connecting portion 9 of the connector 5. The pipe inserting portion 7 comprises a cylindrical link portion 13 which is provided integrally with the resin tube connecting portion 9 in connected relation, on one axial end of the pipe inserting portion 7, a tubular holder portion 15 of enlarged diameter on an opposite axial end of the pipe inserting portion 7, and a cylindrical sealing portion 17 in the middle axially of the pipe inserting portion 7, which is sized smaller than the tubular holder portion 15 in diameter, but larger than the cylindrical link portion 13 in diameter. A peripheral wall of the tubular holder portion 15 of the pipe inserting portion 7 comprises flat panel-like portions 19, 19 located in diametrical opposite positions thereof (refer to FIG. 4), and arcuate portions 21, 21 respectively arranged between the flat panel-like portions 19, 19. The arcuate portions 21, 21 are provided with engagement windows 23, 23 respectively in opposed relation to each other. In the cylindrical sealing portion 17 of the pipe inserting portion 7, a pair of O-rings 25, 25 (sealing members) are fitted axially in side-by-side relation with a collar 27 therebetween within the inner peripheral surface thereof A step portion or shoulder portion 29 is provided between an outer peripheral surface of the tubular holder portion 15 and an outer peripheral surface of the cylindrical sealing portion 17, thus the tubular holder portion 15 is provided with an annular first end surface 31 on a periphery at one axial end thereof.

Figure 2:
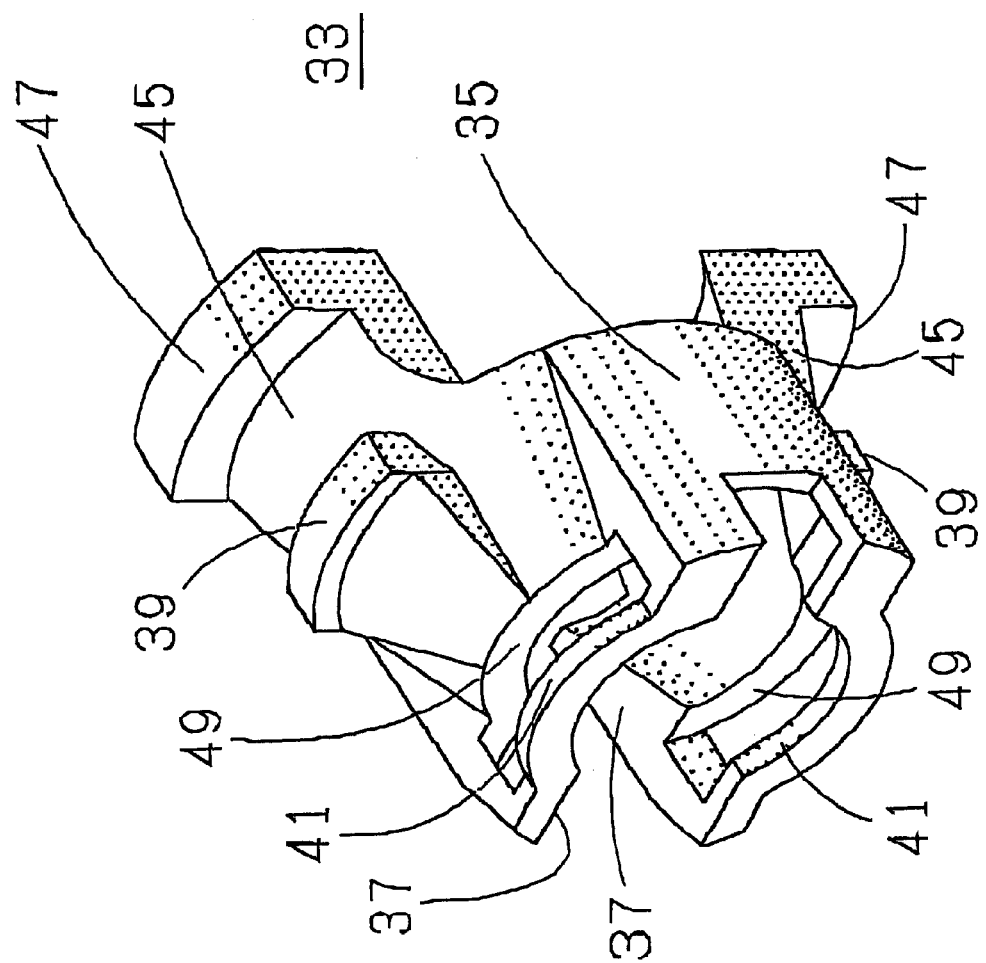
FIG. 2 is a perspective view of a retainer.

A retainer 33 made of PA is fitted in the tubular holder portion 15 of the pipe inserting portion 7. This retainer 33 is relatively flexible, and is formed so as to be resiliently deformable. As shown in FIG. 2, the retainer 33 has a main body 35 of C-shape in cross-section wherein a relatively large space is defined between circumferential opposite end portions 37, 37 thereof. The main body 35 is provided with a pair of stopper portions 39, 39 projecting radially outwardly in diametrical opposed positions of an opposite axial end portion thereof. An inner surface of the main body 35 tapers generally in the direction to one axial end thereof so as to reduce gradually an inner diameter thereof. One axial end portion of the main body 35 serves as an engagement portion 41, generally defining an inner diameter smaller than an outer diameter of an annular engagement projection 43 on an outer peripheral surface of the pipe 1 on one axial end or on an insertion end thereof, and substantially identical to an outer diameter of the pipe 1. A pair of operation arms 45, 45 are formed integrally on an opposite axial end portion of the main body 35 of the retainer 33 so as to extend inclining radially outwardly in an opposite direction axially from respective circumferential positions corresponding to the stopper portions 39, 39. The operation arms 45, 45 have latching ends 47, 47, projecting radially outwardly on an opposite axial end portion thereof respectively. The engagement portion 41 is provided with engagement slits 49, 49 extending circumferentially in opposed relation to each other.

As shown in FIG. 1, thus configured retainer 33 is inserted and fitted in the tubular holder portion 15 of the pipe inserting portion 7, so that the stopper portions 39, 39 are seated in the engagement windows 23, 23, and the latching ends 47, 47 are engaged with the tubular holder portion 15 on an opposite axial end thereof The pipe 1 to be connected with the resin tube 3 is pushed, and fittingly inserted into an opening 51 on one end of the pipe inserting portion 7 of the connector 5 so that the annular engagement projection 43 progresses while radially expanding an inner surface of the main body 35 of the retainer 33 until the annular engagement projection 43 seats in the engagement slits 49, 49 in snap-engagement relation therewith. The pipe 1 is further provided with an annular projection 53 with substantially same configuration as the annular engagement projection 43 on an outer peripheral surface thereof, on an opposite axial end of the annular engagement projection 43 of the pipe 1. The annular projection 53 is arranged on the pipe 1 so as to be located axially outside of the opening 51 on one end of the pipe inserting portion 7, while the pipe 1 is correctly inserted and fitted in the connector 5 so that the annular engagement projection 43 seats and engages in the engagement slits 49, 49 of the retainer 33. The annular engagement projection 43 which is fitted and snap-engaged in the engagement slits 49, 49 of the main body 35 of the retainer 33 blocks or limits further axial in-and-out movement of the pipe 1 with respect to the connector 5. That is, the pipe 1 is thereby almost locked against relative axial movement in the connector 5. One axial end or insertion end of the pipe 1 reaches in the cylindrical link portion 13 beyond a pair of O-rings 25, 25 within the cylindrical sealing portion 17, and thereby a seal is formed by the O-rings 25, 25 between an outer peripheral surface of the pipe 1 and the inner peripheral surface of the pipe inserting portion 7 of the connector 5.

In the event of removing the pipe 1 from the connector 5, the latching ends 47, 47 of the operating arms 45, 45 of the retainer 33 are pressed radially inwardly from outside to narrow a radial space between the operating arms 45, 45, thus a radial space between the stopper portions 39, 39. And, thereby the stopper portions 39, 39 are out of the engagement windows 23, 23, and the retainer 33 can be relatively pulled out of the connector 5. As the retainer 33 is relatively pulled out of the connector 5, the pipe 1 is also pulled out of the connector 5 along with the retainer 33.

The pipe 1 comprises integrally a straight pipe portion 55 including the annular engagement projection 43 on one axial end thereof and the annular projection 53 on an opposite axial end of the annular engagement projection 43, a curved portion 57 on an opposite axial end of the straight pipe portion 55, and an extending portion 59 extending from the curved portion 57. The straight pipe portion 55 of the pipe 1 is inserted in the pipe inserting portion 7 of the connector 5 so as to extend axially outwardly from the opening 51 of the pipe inserting portion 7. That is, an opposite axial end of the straight pipe portion 55 extends axially outwardly from the opening 51. The pipe 1 should be connected to the connector 5 so that the curved portion 57 is bent in the opposite direction to the extending direction of the resin tube connecting portion 9 or in a direction away from the resin tube connecting portion 9 and in a direction along a virtual plane including an axis of the resin tube connecting portion 9 and an axis of the connector 5, and the extending portion 59 extends from the curved portion 57 in the opposite direction to the extending direction of the resin tube connecting portion 9 or in a direction away from the resin tube connecting portion 9 and in a direction along the virtual plane (refer to FIG. 4).

Figure 3:
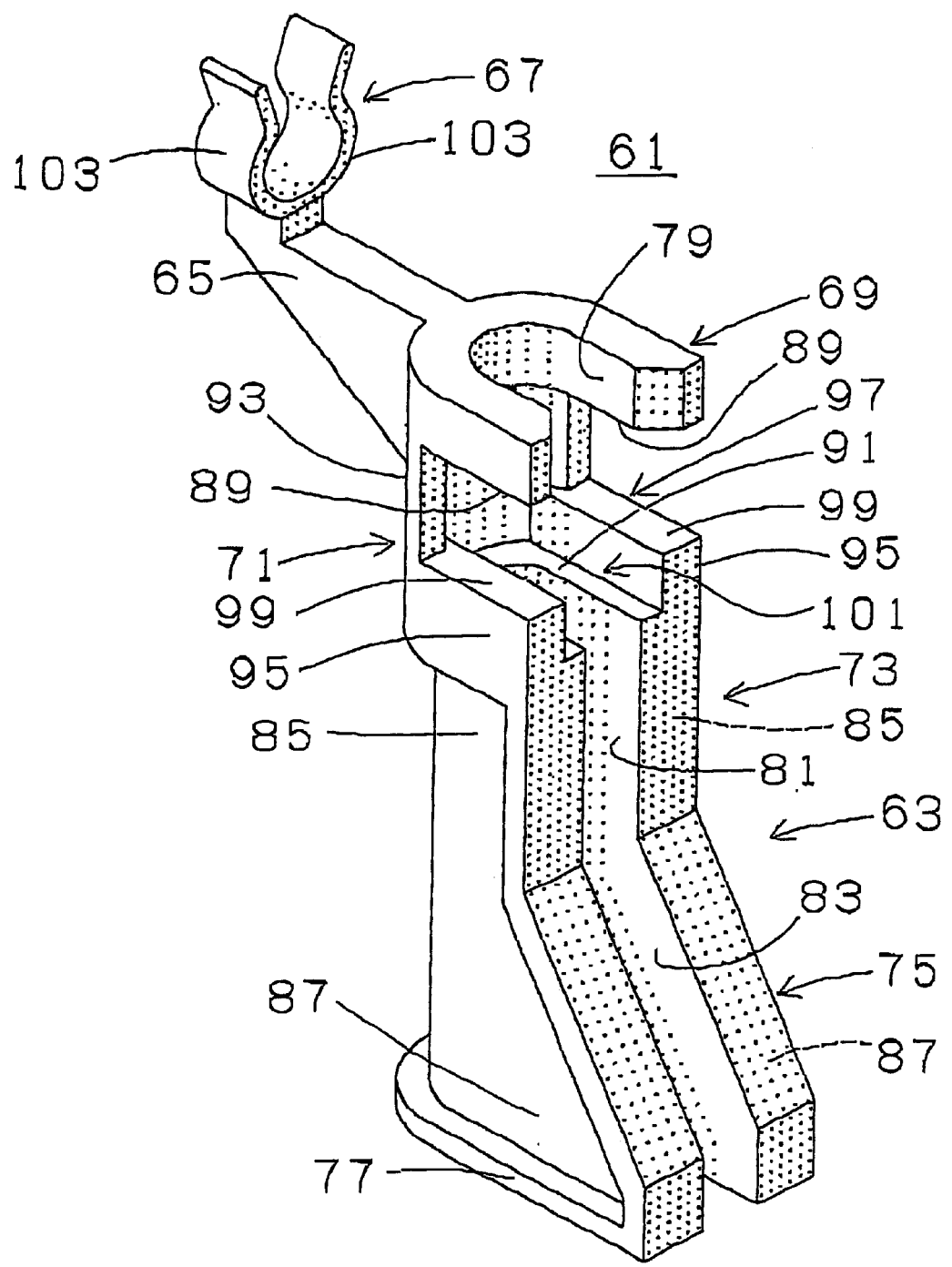
FIG. 3 is a perspective view of the connector clip of the present invention.
Figure 4:
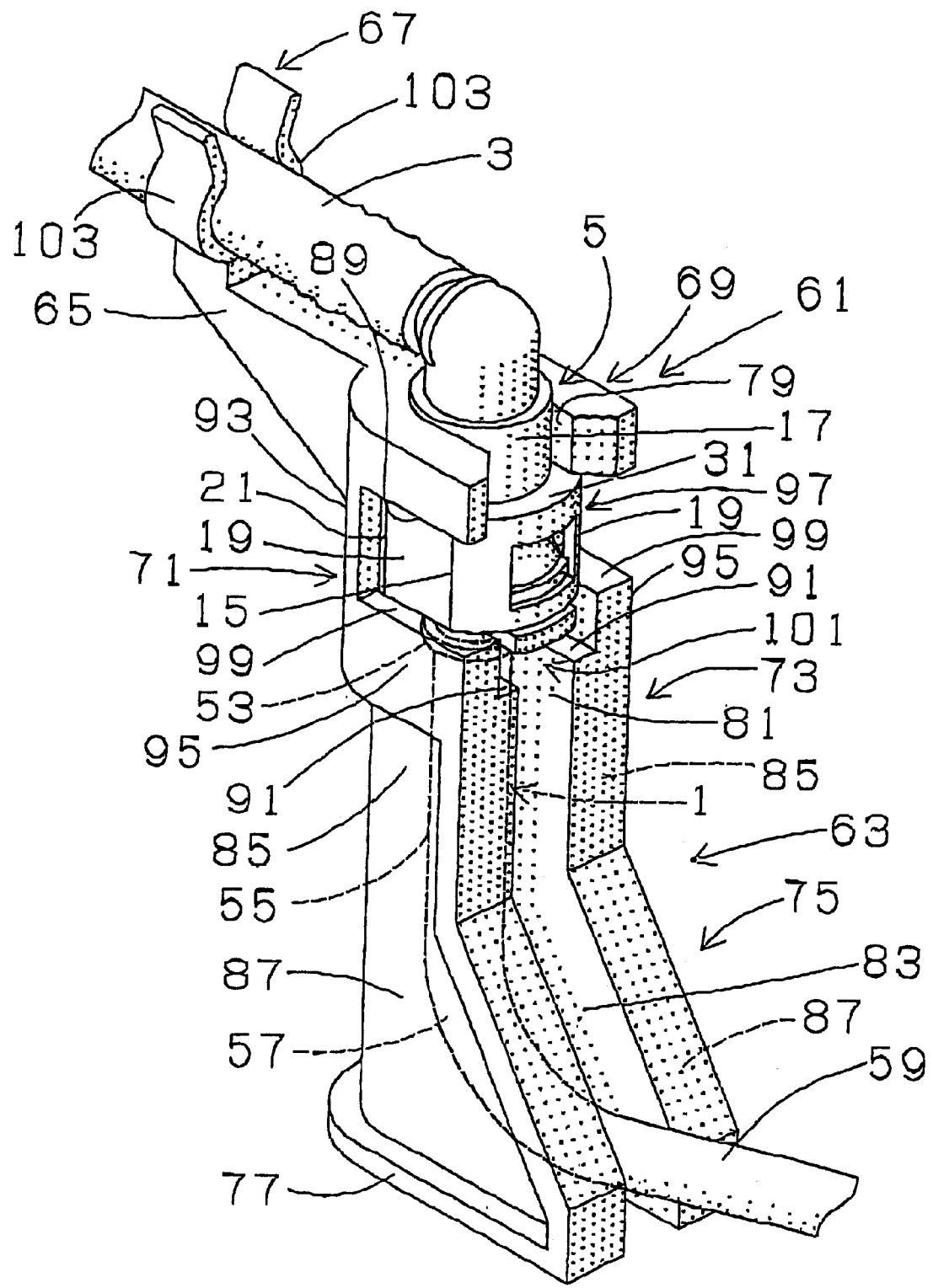
FIG. 4 is a perspective view showing the connector clip of FIG. 3 mounted onto the connecting portion of FIG. 1.

As for material of the connector clip 61 for verifying complete connection or half-fitting, or for preventing incomplete connection shown in FIG. 3 to be mounted on the connector 5 and the pipe 1, usually thermoplastic resin may be used. Specifically, in the case that heat resistance property is required, polyamide resin such as PA11, PA12, PA66 and the like are used. On the other hand, the connector clip 61 made of polyester resin or polypropylene resin such as PP and the like can be manufactured at lower cost. As shown in FIG. 3 and FIG. 4, the connector clip 61 comprises integrally an elongate or axially elongate holder portion 63 for being mounted to a length of the connector 5 and the pipe 1, i.e., from the connector 5 to the curved portion 57, a support portion 65 extending from one axial or longitudinal end portion of the holder portion 63, rearwardly (in the extending direction of the resin tube connecting portion 9) in a curved manner (in a curved manner at right angle in this embodiment) or being disposed at an angle (at 90° or transversely in this embodiment) with respect to the holder portion 63, and a C-shaped clamp 67 for clipping or fitting on the resin tube 3, which is disposed on the support portion 65, at an end portion opposite the holder portion 63. The support portion 65 and the C-shaped clamp 67 function as a connector connecting portion.

The holder portion 63 comprises a fitting portion 69 formed on one longitudinal end portion thereof, a holding portion 71 constructed on an opposite axial or longitudinal end of the fitting portion 69, a first receiving portion or a straight pipe receiving portion 73 formed on an opposite axial or longitudinal end of the holding portion 71, and a second receiving portion or a pipe connecting portion 75 formed on an opposite axial or longitudinal end of the first receiving portion 73, or an opposite axial or longitudinal end of the holder portion 63. The fitting portion 69 is adapted to fit on and receive the cylindrical sealing portion 17 of the connector 5. The holding portion 71 is adapted to hold a length of the connector 5 and the pipe 1 from the tubular holder portion 15 to the annular projection 53 of the straight pipe portion 55. The first receiving portion 73 is adapted to fit on and receive entirely or substantially entirely an opposite end portion or end of the straight pipe portion 55 extending axially from the annular projection 53. The second receiving portion 75 is adapted to fit on and receive entirely or substantially entirely the curved portion 57 of the pipe 1. An outer surface of the first receiving portion 73 and the second receiving portion 75 is recessed so as to leave an edge portion or frame portion 77 substantially along an outer edge thereof. Therefore, the holder portion 63 is constructed lightweight. The fitting portion 69, the holding portion 71 and the first receiving portion 73 function as a mounting portion or mounting body, while the second receiving portion 75 functions as a pipe connecting portion.

The fitting portion 69 of the holder portion 63 is formed in U-shape and longitudinally thick to be provided with a U-shaped slot 79 which has an opening into a front direction (an opposite direction to an extending direction of the support portion 65 or the resin tube connecting portion 9). The opening of the U-shaped slot 79 is widened gradually toward a front direction. The fitting portion 69 receives the cylindrical sealing portion 17 to be fitted and clipped radially in the U-shaped slot 79 or to be snap-fitted in a semi-circular rear portion of the U-shaped slot 79. The first receiving portion 73 of the holder portion 63 is formed relatively elongate in U-shape in cross-section so as to define a first slot or a straight pipe portion slot 81 of U-shape having an opening into a front direction. The first receiving portion 73 receives an opposite end portion or end of the straight pipe portion 55 extending axially from the annular projection 53 to be fitted and clipped radially in the first slot 81. The second receiving portion 75 of the holder portion 63 is also formed in U-shape in cross-section so as to define a second slot or a curved portion slot 83 of U-shape, being continued to the first slot 81 and having an opening into a front direction. The second receiving portion 75 receives the curved portion 57 of the pipe 1 to be fitted and clipped radially in the second slot 83. The first slot 81 is open at axial or longitudinal opposite ends of the first receiving portion 73, and the second slot 83 is open at an opposite axial or longitudinal end of the second receiving portion 75. That is, in the event that the pipe 1 is formed more or less in different shape, for example, in the event that the straight pipe portion 55 is formed somewhat elongated and thereby the curved portion 57 is disposed further toward an opposite axial or longitudinal direction, even so, the second receiving portion 75 can receive the curved portion 57 in the second slot 83 in co-rotatable relation. In the first receiving portion 73, end surfaces of opposite side walls 85, 85 on the opening end extend straight axially or longitudinally, and on the other hand, in the second receiving portion 75, end surfaces of opposite side walls 87, 87 on the opening end extend gradually inclining toward a front direction, in an opposite longitudinal direction. Thus, the second receiving portion 75 receives the curved portion 57 of the pipe 1 up to a leading end or up to proximity to the leading end thereof. That is, the second receiving portion 75 receives the curved portion 57 entirely or generally entirely, and thereby is connected to the pipe 1 precisely in non-rotatable or co-rotatable relation thereto. A space between the opposite side walls 85, 85 of the first receiving portion 73, or a width of the first slot 81 is configured sufficiently smaller than an outer diameter of the annular projection 53 of the pipe 1.

Figure 5:
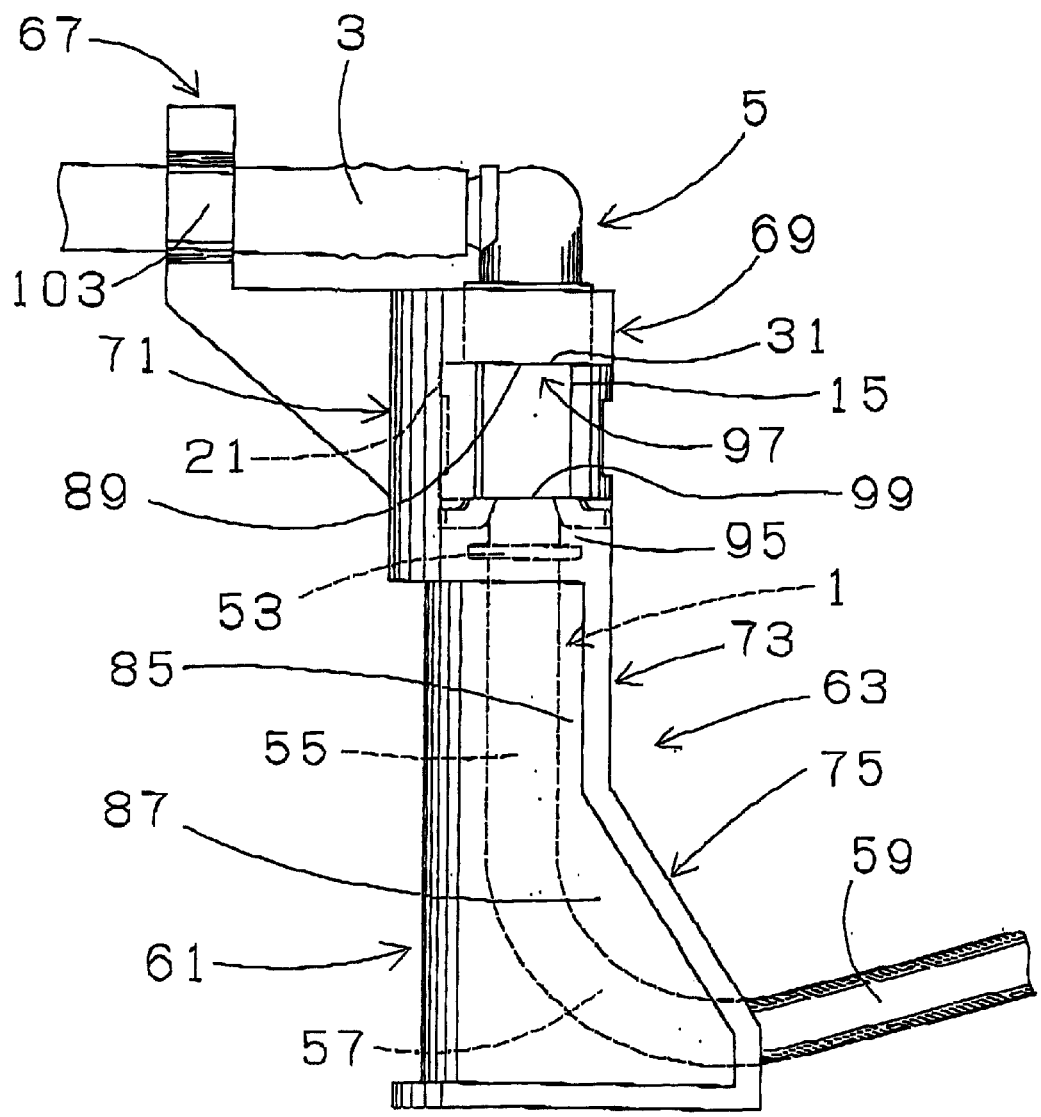
FIG. 5 is a side elevation view showing the connector clip of FIG. 3 mounted onto the connecting portion of FIG. 1.

The holding portion 71 has a rear joint portion 93 of an arcuate smaller than a half circle in cross-section integrally extending between the fitting portion 69 and the first receiving portion 73, and is constructed between an end surface 89 on an opposite longitudinal end of the fitting portion 69 and an end surface 91 on one longitudinal end of the first receiving portion 73. The connector clip 61 is mounted to the connector 5 so that an inner surface of the rear joint portion 93 approaches or contacts the arcuate portion 21 located in the rear of the tubular holder portion 15 or on the end of the resin tube connecting portion 9. Side edge portions 95, 95 are formed on the opposite end portions of the end surface 91 of the first receiving portion 73 respectively. These side edge portions 95, 95 extend respectively over the annular projection 53 of the pipe 1 toward one axial or longitudinal end so as to reach a position of the latching end 47 of the retainer 33 which is fitted in the tubular holder portion 15 of the connector 5. The side edge portions 95, 95 are formed relatively laterally thick. In this embodiment, as understood better with reference to FIG. 5, the side edge portions 95, 95 extend to the position of an annular second end surface on an opposite axial end of the tubular holder portion 15, and a connector holding portion 97 is constructed between one longitudinal end surfaces 99, 99 of the side edge portions 95, 95 and the end surface 89 of the fitting portion 69 so as to hold the tubular holder portion 15 from opposite axial ends (alternatively the side edge portions 95, 95 may be formed lower so as not to construct the connector holding portion 97). The connector holding portion 97 does not have a non-rotating function relative to the connector 5. A space between the end surface 89 of the fitting portion 69 and the end surfaces 99, 99 of the side edge portions 95, 95 is designed generally identical to an axial length of the tubular holder portion 15 of the connector 5. Also, a space between the end surface 89 of the fitting portion 69 and the end surface 91 of the first receiving portion 73 is designed generally identical to an axial distance between the first end surface 31 of the tubular holder portion 15, and the annular projection 53 of the pipe 1 (an opposite axial end of the annular projection 53). Therefore, the holding portion 71 holds a length of the connector 5 and the pipe 1 from the tubular holder portion 15 to the annular projection 53 therein, in abutment, contact or adjacent relation between the end surface 89 of the fitting portion 69 and the first end surface 31 of the tubular holder portion 15, between the end surface 91 of the first receiving portion 73 and the annular projection 53, and between the end surfaces 99, 99 of the side edge portions 95, 95 and the second end surface of the tubular holder portion 15. Accordingly, the holding portion 71 holds a length of the connector 5 and the pipe 1 from the tubular holder portion 15 to the annular projection 53 while substantially preventing the length from axial or longitudinal displacement relatively. A space between the side edge portions 95, 95 is, for example, generally identical to an outer diameter of the annular projection 53, or somewhat larger than an outer diameter of the annular projection 53, and a projection receiving portion 101 is formed to receive the annular projection 53 between the side edge portions 95, 95. Hence, the holding portion 71 comprises the connector holding portion 97 and the projection receiving portion 101.

Figure 6:
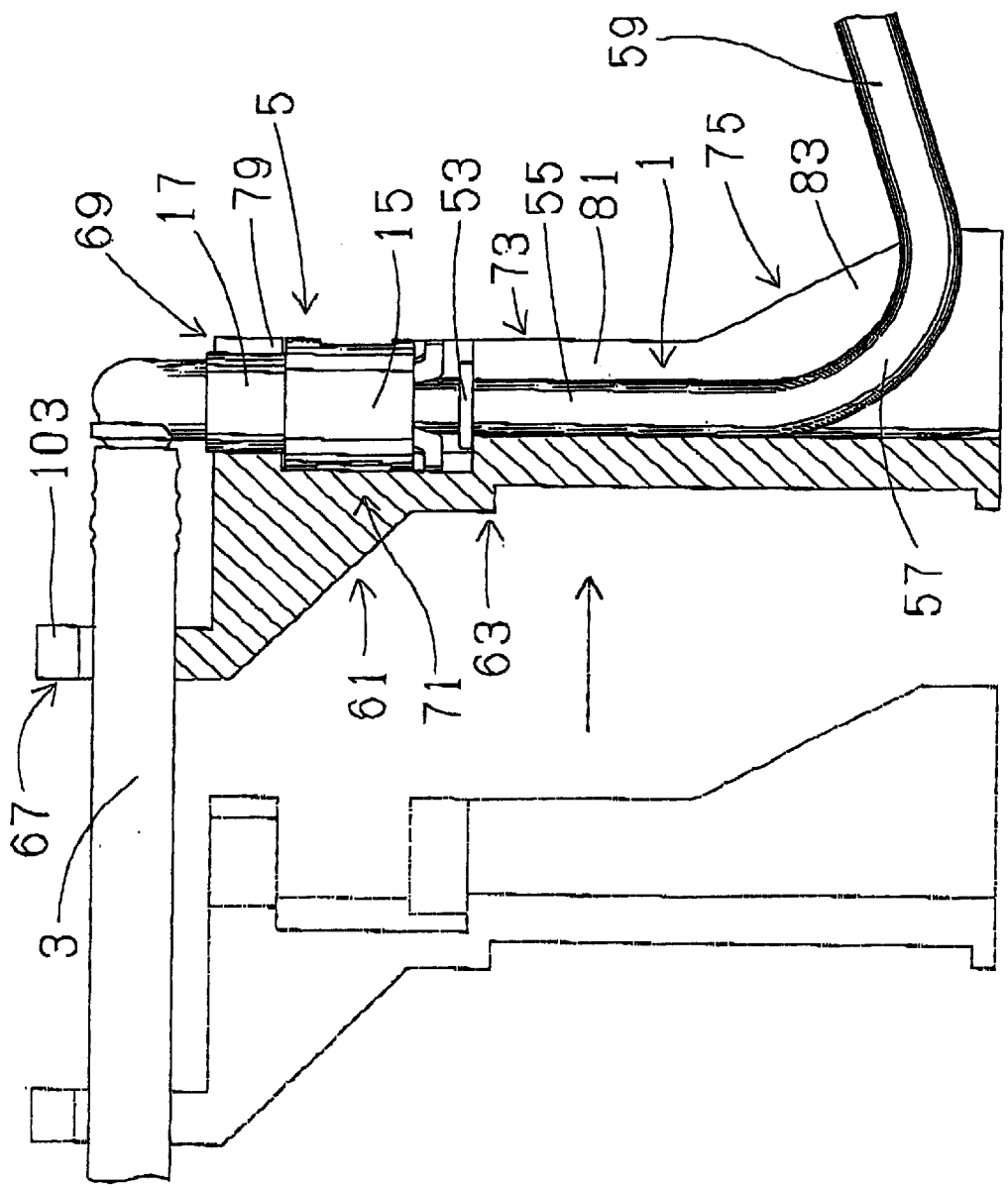
FIG. 6 is an explanatory view showing one example of methods for mounting the connector clip of FIG. 3 onto the connecting portion of FIG. 1.

As shown in FIG. 6, in order to mount the connector clip 61 to a connecting portion between the pipe 1 and the resin tube 3, first, the C-shaped clamp 67 is fitted onto the resin tube 3 connected to the connector 5. As the C-shaped clamp 67 has an opening on one longitudinal end or one axial end, the C-shaped clamp 67 is fitted on and connected to the resin tube 3 from an opposite longitudinal direction to engage clampingly the resin tube 3. When the connector 5 and the resin tube 3 are rotated around an axis of the connector 5 or the pipe inserting portion 7, the connector clip 61 also would entirely rotate along therewith by fitting and engaging the C-shaped clamp 67 onto the resin tube 3. Since the C-shaped clamp 67 is open transversely of a direction of rotation about the axis of the connector 5, more specifically, since clamp arms 103, 103 of the C-shaped clamp 67 engage the resin tube 3 so as to restrain rotation of the resin tube 3 around the axis of the connector 5, it provides a considerable function as lock against relative rotation between the connector 5 and the pipe 1 to fit the C-shaped clamp 67 onto the resin tube 3.

Then, the C-shaped clamp 67 is somewhat relatively slid on the resin tube 3, and the connector clip 61 is moved in a direction shown by an arrow of FIG. 6, so that the cylindrical sealing portion 17 of the connector 5 is received in the U-shaped slot 79 of the fitting portion 69 of the holder portion 63, an opposite end portion or end of the straight pipe portion 55 extending axially from the annular projection 53 is received in the first slot 81 of the first receiving portion 73 with a width slightly smaller than an outer diameter of the pipe 1 or the straight pipe portion 55, the curved portion 57 of the pipe 1 is received in the second slot 83 of the second receiving portion 75 with a width slightly smaller than an outer diameter of the pipe 1 or the curved portion 57, and a length of the connector 5 and the pipe 1 from the tubular holder portion 15 to the annular projection 53 of the straight pipe portion 55 is located or held in the holding portion 71. After this manner, the connector clip 61 is completely mounted onto the connector 5 and the pipe 1, or onto the connecting portion in the piping. As the second receiving portion 75 receives or is connected to the pipe 1 in co-rotatable relation therewith while the curved portion 57 of the pipe 1 is received in the second slot 83, the connector clip 61 is connected both to the connector 5 and to the pipe 1 in co-rotatable relation therewith. That prevents the connector 5 and the pipe 1 from moving rotationally relatively.

Figure 7:
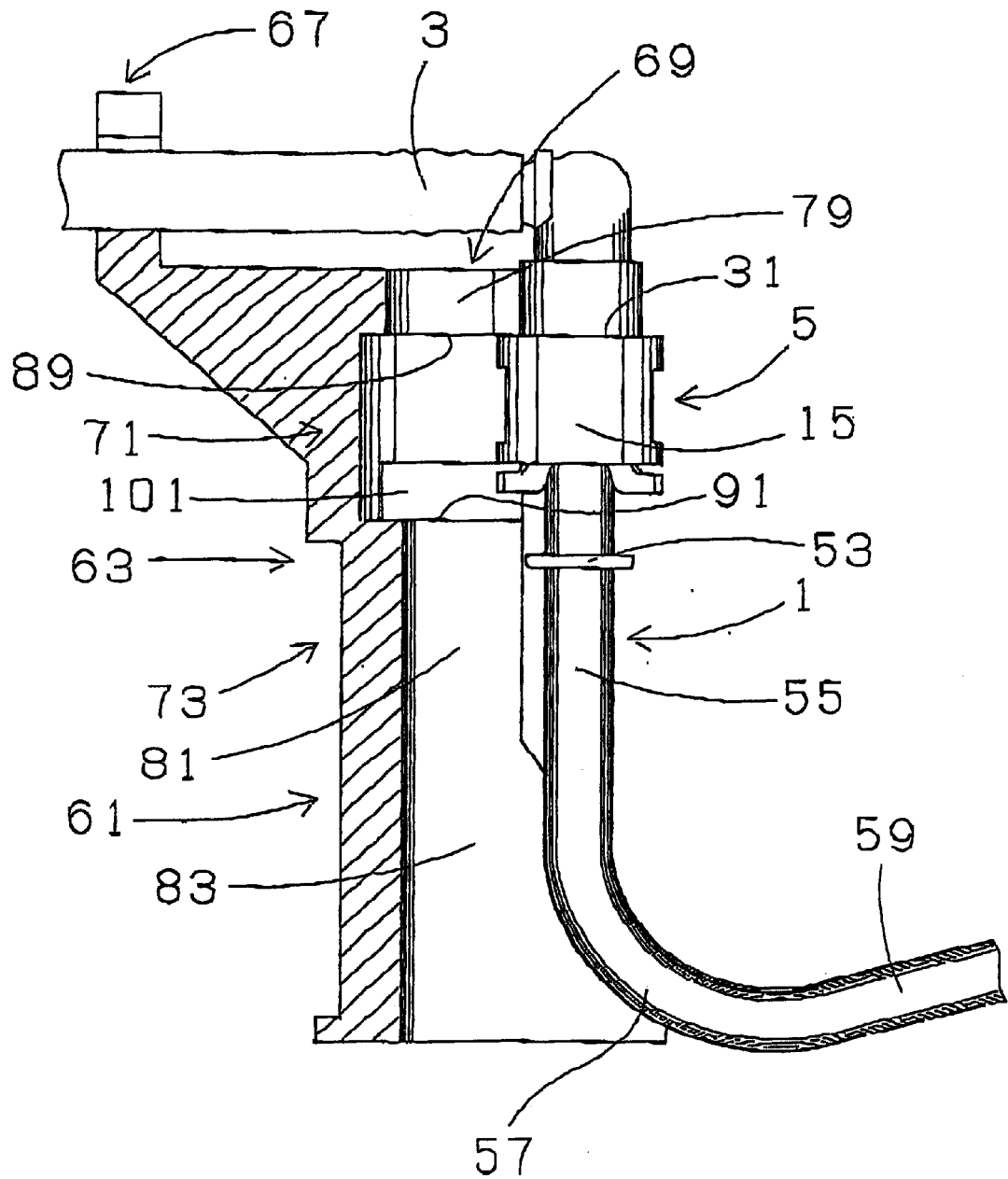
FIG. 7 is an explanatory view showing the case that the connector clip of FIG. 3 cannot be mounted due to incomplete connection of a pipe with a connector.

As shown in FIG. 7, in case that the pipe 1 is not completely inserted and fitted in the connector 5, more specifically in the case that the annular engagement projection 43 of the pipe 1 does not engage in the engagement slits 49, 49 of the retainer 33, or in the case that the stopper portions 39, 39 of the retainer 33 are not seated and engaged in the engagement windows 23, 23 formed in the arcuate portions 21, 21 of the tubular holder portion 15 of the connector 5, that is, in the case of incomplete connection, the annular projection 53 of the pipe 1 is not located so as to be received in the holding portion 71 or the projection receiving portion 101, but is located on a part of the first receiving portion 73 as the annular projection 53 of the pipe 1 is away from the tubular holder portion 15 compared to the case of connection made completely. However, a width of the first slot 81 of the first receiving portion 73 is formed sufficiently smaller than an outer diameter of the annular projection 53. Therefore, the annular projection 53 cannot be received in the first slot 81 of the first receiving portion 73, and as a result, the holder portion 63 cannot be mounted onto the connecting portion in the piping. Hence, it can be verified whether the pipe 1 is connected to the connector 5 without fail.

Figure 8:
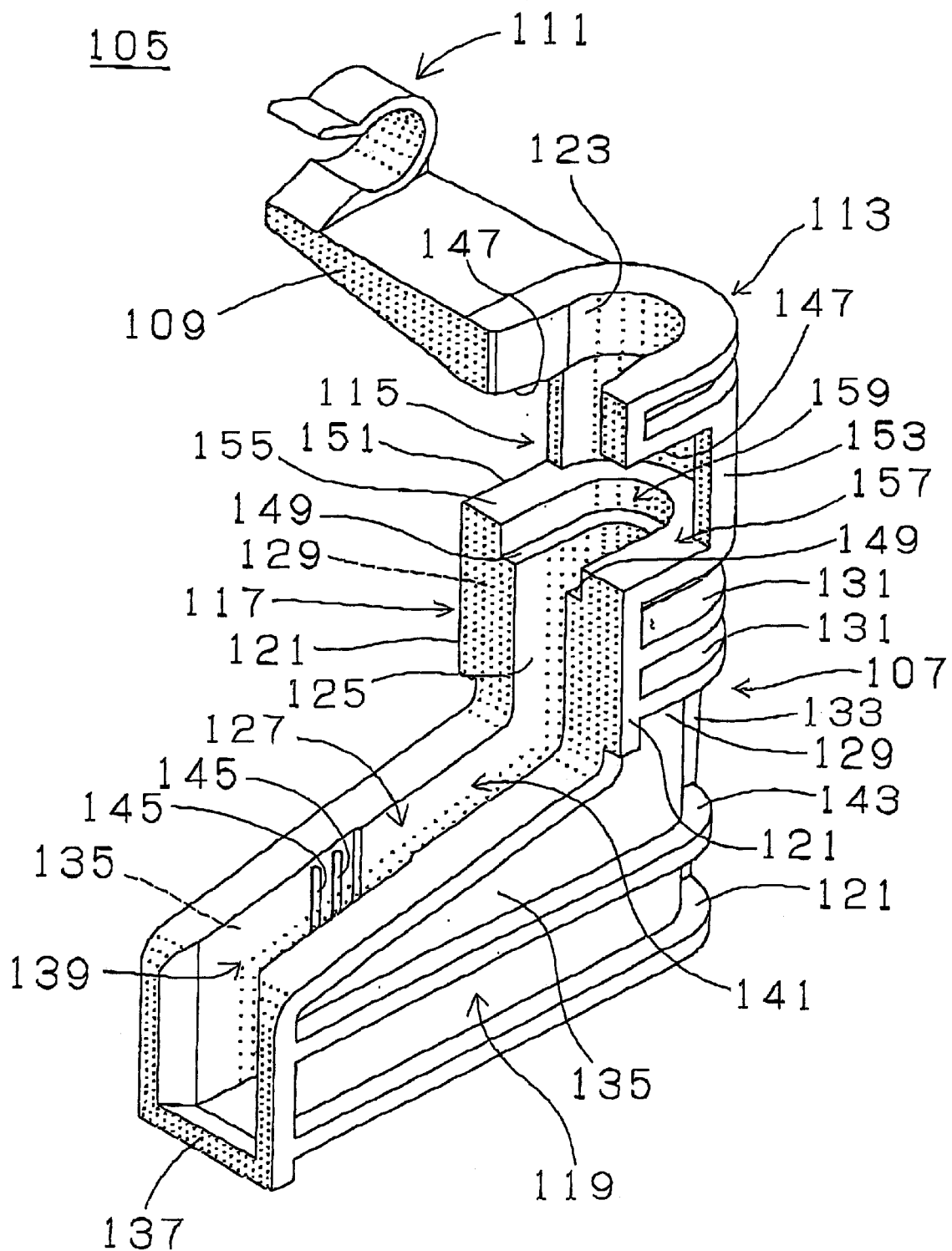
FIG. 8 is a perspective view of another connector clip of the present invention.
Figure 9:
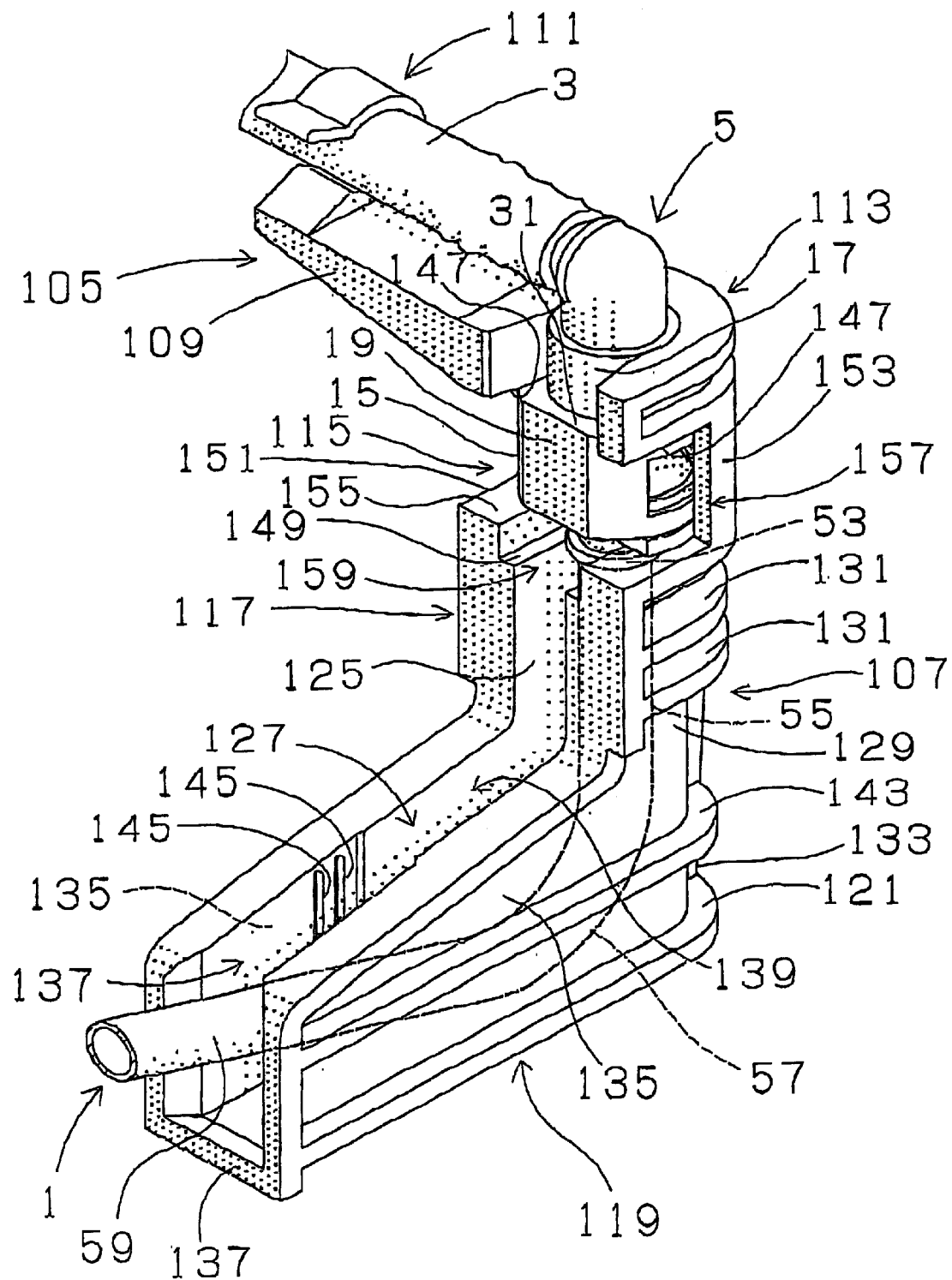
FIG. 9 is a perspective view showing the connector clip of FIG. 8 mounted onto the connecting portion of FIG. 1.
Figure 10:
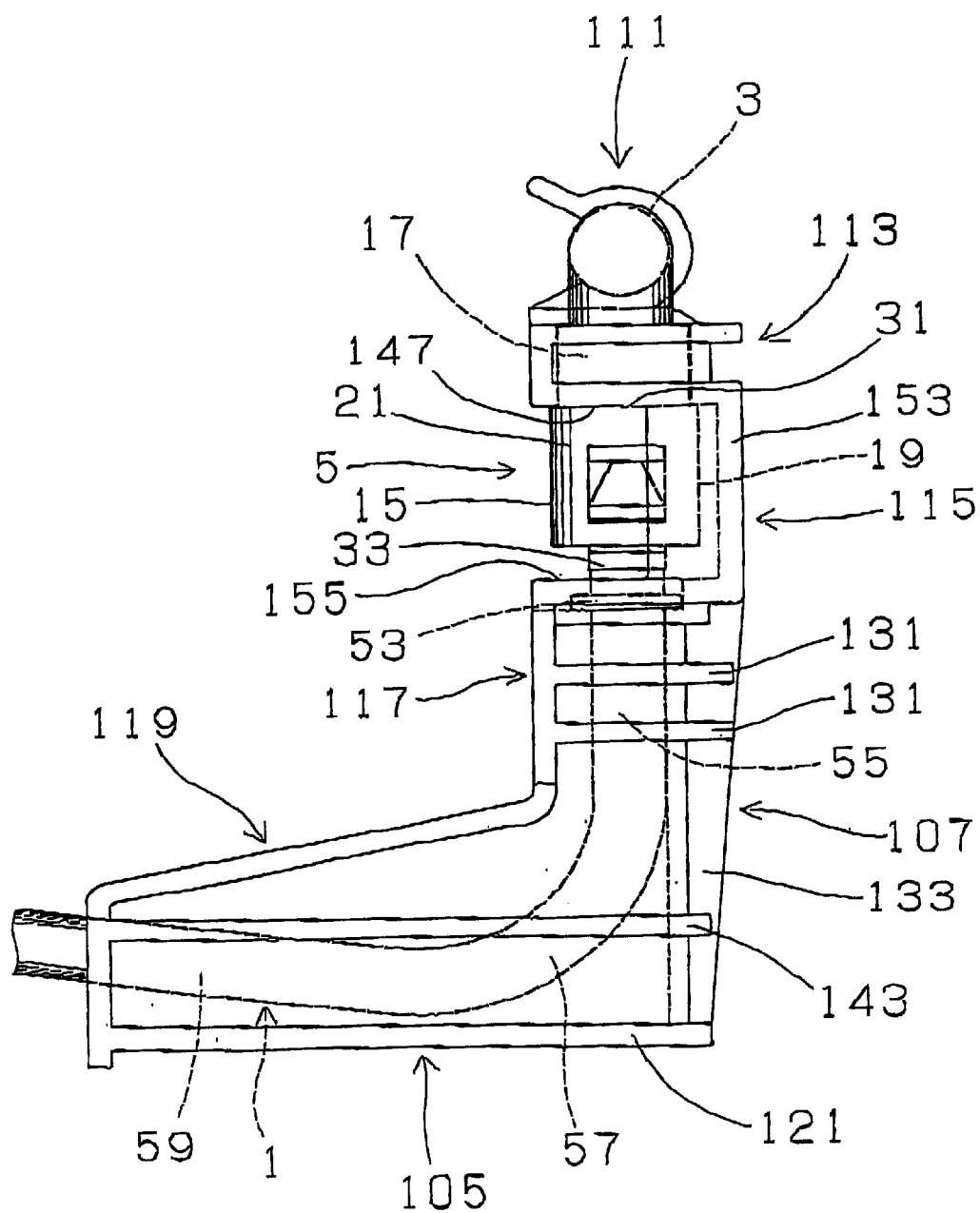
FIG. 10 is a side elevation view showing the connector clip of FIG. 8 mounted onto the connecting portion of FIG. 1.

FIG. 8 shows a connector clip 105 of another configuration. As for material of the connector clip 105, thermoplastic resin may be widely used as well. For example, may be used polyamide resin such as PA11, PA12, PA66 and the like, polyester resin or polypropylene resin such as PP and the like. As shown in FIGS. 8 and FIG. 9, the connector clip 105 comprises integrally a relatively elongate or axially relatively elongate holder portion 107 for being mounted to a length of the connector 5 and the pipe 1, i.e., from the connector 5 to the curved portion 57 and the extending portion 59, a support portion 109 extending laterally (in an extending direction of the resin tube connecting portion 9) from one axial or longitudinal end portion of the holder portion 107 in a curved manner (in a curved manner at right angle in this embodiment), or at an angle (at 90° or transversely in this embodiment) with respect to the holder portion 107, and a C-shaped clamp 111 for clipping or fitting on the resin tube 3, which is disposed on the support portion 109, at an end portion opposite the holder portion 107. The support portion 109 and the C-shaped clamp 111 function as a connector connecting portion.

The holder portion 107 comprises a fitting portion 113 formed on one axial or longitudinal end portion thereof, a holding portion 115 constructed on an opposite axial or longitudinal end of the fitting portion 113, a first receiving portion or a straight pipe receiving portion 117 formed on an opposite axial or longitudinal end of the holding portion 115, and a second receiving portion or a pipe connecting portion 119 formed on an opposite axial or longitudinal end of the first receiving portion 117, or an opposite axial or longitudinal end of the holder portion 107. The fitting portion 113 is adapted to fit on and receive the cylindrical sealing portion 17 of the connector 5. The holding portion 115 is adapted to hold a length of the connector 5 and the pipe 1 from the tubular holder portion 15 to the annular projection 53 of the straight pipe portion 55. The first receiving portion 117 is adapted to fit on and receive entirely or substantially entirely an opposite axial end portion or end of the straight pipe portion 55 extending axially from the annular projection 53. The second receiving portion 119 is adapted to fit on and receive the curved portion 57 and the extending portion 59 of the pipe 1. An outer surface of the first receiving portion 117 and the second receiving portion 119 is recessed so as to leave an edge portion or frame portion 121 substantially along an outer edge thereof. Therefore, the holder portion 107 is constructed lightweight. The fitting portion 113, the holding portion 115 and the first receiving portion 117 function as a mounting portion or a mounting body, while the second receiving portion 119 functions as a pipe connecting portion.

The fitting portion 113 of the holder portion 107 is formed in U-shape and longitudinally thick to be provided with a U-shaped slot or U-like slot 123 which has an opening into a front direction (transversely of an extending direction of the support portion 109 or transversely of an extending direction of the resin tube connecting portion 9 ). The support portion 109 is formed integrally lateral to the fitting portion 113. The opening of the U-shaped slot 123 is widened gradually toward a front direction. The fitting portion 113 receives the cylindrical sealing portion 17 to be snap-fitted in a semicircular rear portion of the U-shaped slot 123. The first receiving portion 117 of the holder portion 107 is formed somewhat elongate in U-shape in cross-section so as to define a first slot or a straight pipe portion slot 125 of U-shape having an opening into a front direction. The first receiving portion 117 receives an opposite end portion or end of the straight pipe portion 55 extending axially from the annular projection 53 to be fitted and clipped radially in the first slot 125. The second receiving portion 119 of the holder portion 107 is also formed in U-shape or elongated U-shape in cross-section so as to define a second slot or a curved portion slot 127 of U-shape or elongated U-shape, being continued to the first slot 125 and having an opening into a front direction. The second receiving portion 119 receives the curved portion 57 and the extending portion 59 of the pipe 1 to be fitted in the second slot 127.

Here, the pipe 1 should be connected to the connector 5 so that the curved portion 57 is bent along a virtual plane including an axis of the connector 5 and transversely of an axis of the resin tube connecting portion 7, and the extending portion 59 extends from the curved portion 57 along the virtual plane (refer to FIG. 9). Also, here, the straight pipe portion 55 is formed somewhat short.

In the first receiving portion 117, end surfaces of side walls 129, 129 on the opening end extend straight axially or longitudinally. The frame portion 121 on the opening end in the first receiving portion 117 laterally protrudes a lot or high, and, thus the end surfaces of the side walls 129, 129 on the opening end are formed rather wide. The first receiving portion 117 is provided integrally with two reinforcing ribs 131, 131 so as to extend circumferentially thereof, on an outer surface thereof. The reinforcing ribs 131, 131 have generally same height as the frame portion 121 on the opening end, and extend from one end of the frame portion 121, around an outer surface of the first receiving portion 117 to an opposite end of the frame portion 121 thereon. A longitudinal rib 133 is provided at a rear portion of an outer surface of the second receiving portion 119 and the first receiving portion 117 so as to gradually increase a height thereof from an opposite longitudinal end toward one longitudinal end. The longitudinal rib 133 is interposed across running paths of the reinforcing ribs 131, 131. That means, each reinforcing rib 131 consists of two sections extending from one end and an opposite end of frame portions 121 respectively to the longitudinal rib 133. Two reinforcing ribs 131, 131 are located on such positions as to divide the first receiving portion 117 longitudinally into three generally equally.

On the other hand, in the second receiving portion 119, side walls 135, 135 are configured to extend largely in a front direction. That is, the second receiving portion 119 extends long in a front direction. End surfaces of the side walls 135, 135 on the opening end are formed so as to extend long forward, inclining in an opposite longitudinal direction, and then extend short straight in the direction of an opposite longitudinal end. The frame portion 121 located on the opening end of the second receiving portion 119 is formed to protrude laterally outwardly less than that located on the opening end of the first receiving portion 117, and opening end surfaces of the side walls 135, 135 are formed narrower than those of the side walls 129, 129 of the first receiving portion 117. An opposite longitudinal end of the second receiving portion 119, that is, an opposite longitudinal end of the second slot 127 is open. However, a bridge 137 is formed integrally between front end portions of opposite longitudinal ends of the side walls 135, 135 to restrain widening deformation or movement of the side walls 135, 135. A front end portion of the opening of the second slot 127 is formed gradually diverging toward a front direction so that the curved portion 57 of the pipe 1 is easily fitted in the second receiving portion 119. A width of the second slot 127 should be designed slightly narrower than an outer diameter of the pipe 1 or the curved portion 57 (including the extending portion 59) so as to clip radially the pipe 1 therein. However, a front end portion of the second slot 127 is formed as a broader portion 139 of which width is generally identical to an outer diameter of the pipe 1, the curved portion 57 or the extending portion 59, while a width of a grip portion or a curved portion slot 141 on a rear or back end of the broader portion 139 of the second slot 127 is designed slightly narrower than an outer diameter of the pipe 1 or the curved portion 57. The second slot 127 comprises the broader portion 139 and the grip portion 141. Thus configured second receiving portion 119 or second slot 127 may avoid such inconvenience as difficulty to fit the pipe 1 in the second slot 127 wherein a bridge is provided to restrain widening deformation or movement between side walls 135, 135 and a width between the side walls 135, 135 is designed entirely narrow. And it also may avoid such inconvenience as low property of non-rotatable or co-rotatable connection of the pipe 1 to the second slot 127 wherein the bridge is not provided to restrain widening deformation or movement therebetween. Accordingly, thus configured second receiving portion 119 or second slot 127 enables to fit the curved portion 57 (including the extending portion 59) of the pipe 1 relatively smoothly in the second slot 127 and to secure precise non-rotatable connection of the pipe 1 to the second slot 127. The grip portion 141 of the second slot 127 receives entirely the curved portion 57 of the pipe 1 and a portion adjacent to the curved portion 57 of the extending portion 59 of the pipe 1, that is, a root portion of the extending portion 59. The second receiving portion 119 is provided integrally with a reinforcing rib 143, so as to extend circumferentially thereof, on an outer surface thereof. The reinforcing rib 143 has generally the same height as the frame portion 121 on the opening end in the second receiving portion 119, and extends from one end of the frame portion 121, around an outer surface of the second receiving portion 119 to an opposite end of the frame portion 121 thereon. A longitudinal rib 133 is interposed across a running path of the reinforcing rib 143. That is, the reinforcing rib 143 consists of two sections extending from one end and an opposite end of the frame portion 121 respectively to the longitudinal rib 133. The reinforcing rib 143 is located substantially in a longitudinal center of the second receiving portion 119.

The numeral reference 145 in FIGS. 8 and 9 indicates each of supplementary ribs extending longitudinally which are formed in opposed relation to each other on inner surfaces of the side walls 135, 135, in a rear end of the broader portion 139 (only the supplementary ribs formed on one side wall 135 are shown). Here, two pairs of supplementary ribs 145, 145 spaced apart in a front to a rear direction are formed. A widthwise distance between the opposed supplementary ribs 145 is designed larger than a width of the grip portion 141, but slightly smaller than an outer diameter of the extending portion 59 or the curved portion 57 of the pipe 1. The supplementary ribs 145 of this configuration can prevent a clearance defined relatively in a long range continuously between a periphery of the pipe 1 or the extending portion 59 and an inner surfaces of a rear end of the broader portion 139 when an end of the curved portion 57 and the extending portion 59 of the pipe 1 is fitted in the second slot 127.

The holding portion 115 is constructed between an end surface 147 on an opposite longitudinal end of the fitting portion 113 and an end surface 149 on one longitudinal end of the first receiving portion 117. The holding portion 115 has an accommodating wall portion 151 of U-shape formed integrally along an outer periphery of the end surface 149 on one longitudinal end of the first receiving portion 117, and a rear joint portion 153 of an arcuate smaller than a half circle in cross-section integrally extending between the accommodation wall portion 151 and the fitting portion 113. The accommodating wall portion 151 is formed relatively laterally thick. The connector clip 105 is mounted on the connector 5 so that a portion of the flat panel-like portion 19 located rear of the tubular holder portion 15 or on the end in a direction away from the curved portion 57 of the pipe 1 somewhat enters the rear joint portion 153. The accommodating wall portion 151 has a thickness so as to extend beyond the annular projection 53 of the pipe 1 to approach the latching end 47 of the retainer 33 which is fitted in the tubular holder portion 15 of the connector 5, here with a clearance of a half of a thickness of the latching end 47, between the accommodating wall portion 151 and the latching end 47. A connector holding portion 157 is provided between an end surface 155 on one longitudinal end of the accommodating wall portion 151 and the end surface 147 on an opposite longitudinal end of the fitting portion 113 to hold a length of the retainer 33 and the connector 5 from the latching end 47 to the tubular holder portion 15. The connector holding portion 157 does not have a non-rotating function relative to the connector 5. A space between the end surface 155 of the accommodating wall portion 151 and the end surface 147 of the fitting portion 113 is designed somewhat larger than an axial length between the first end surface 31 of the tubular holder portion 15 and the latching end 47 (an opposite axial end thereof) of the retainer 33. Also a space between the end surface 147 of the fitting portion 113 and the end surface 149 of the first receiving portion 117 is designed substantially identical to an axial distance between the first end surface 31 of the tubular holder portion 15 and the annular projection 53 of the pipe 1 (an opposite axial end thereof). Therefore, the holding portion 11 5 holds a length of the connector 5 and the pipe 1 from the tubular holder portion 15 to the annular projection 53, in abutment, contact or adjacent relation between the end surface 147 of the fitting portion 113 and the first end surface 31 of the tubular holder portion 15, and the end surface 149 of the first receiving portion 117 and the annular projection 53. Accordingly the holding portion 115 holds a length of the connector 5 and the pipe 1 from the tubular holder portion 15 to the annular projection 53 of the pipe 1, while substantially preventing the length from axial or longitudinal displacement relatively. An inner width of the accommodating wall portion 151 and an inner diameter of the rear half circular portion thereof are designated, for example; substantially identical to, or somewhat larger than an outer diameter of the annular projection 53. Hence, the accommodating wall portion 151 is internally provided a projection receiving portion 159 so as to receive the annular projection 53 to be fitted in the rear half circular portion. Hence, the holding portion 115 comprises the connector holding portion 157 and the projection receiving portion 159.

Figure 11:
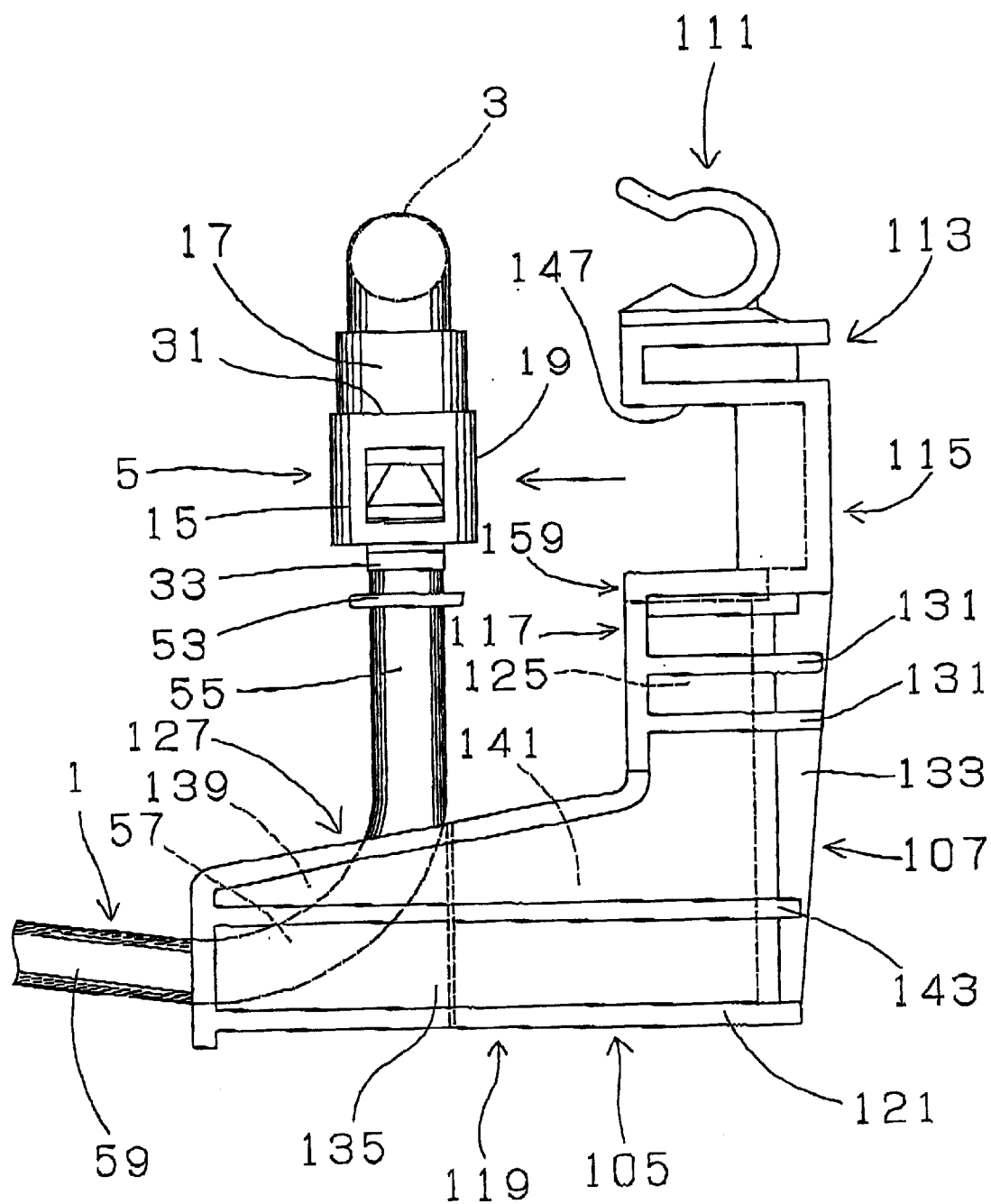
FIG. 11 is an explanatory view showing one example of methods for mounting the connector clip of FIG. 8 onto the connecting portion of FIG. 1.
Figure 12:
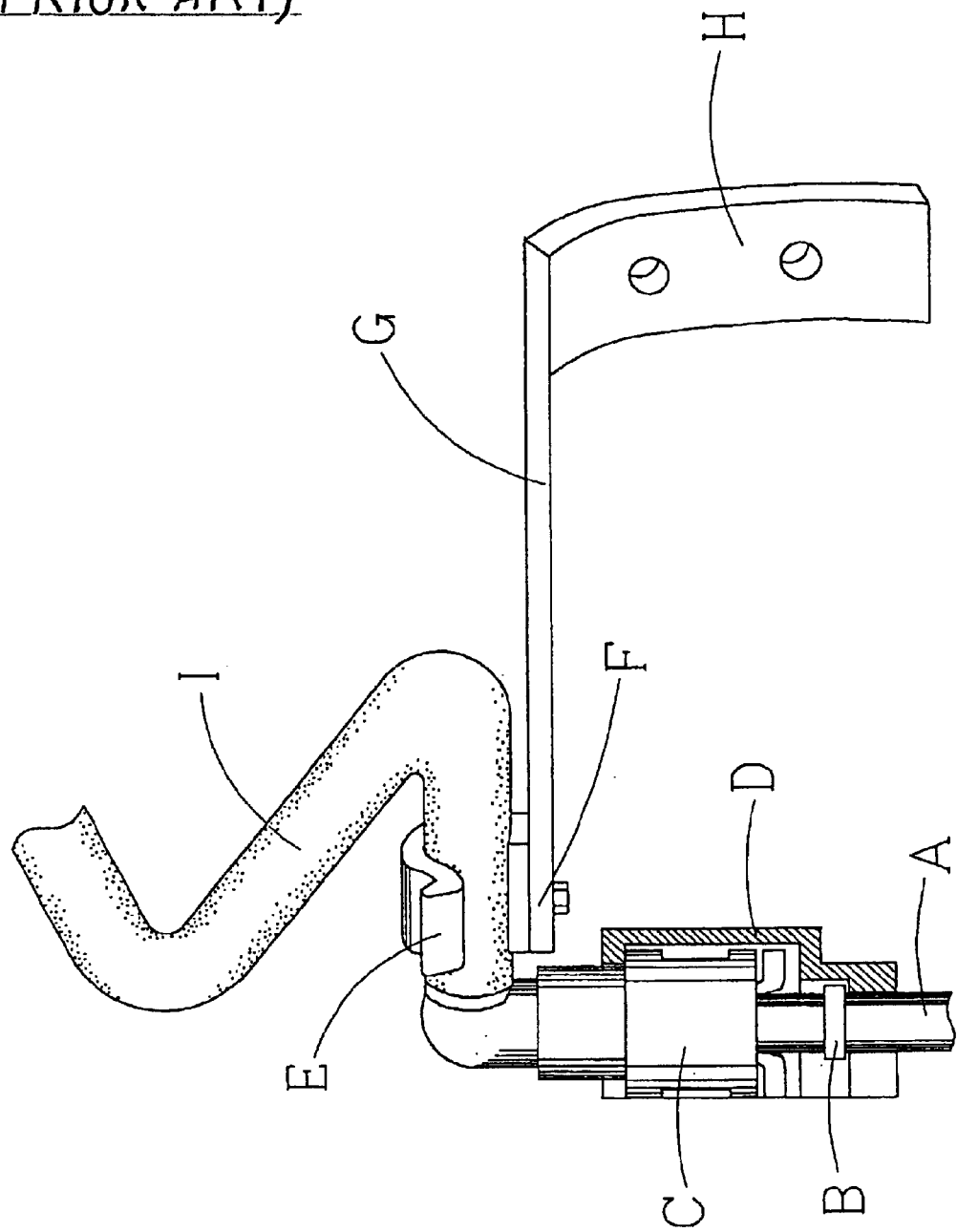
FIG. 12 is a view showing a pipe connecting structure in the prior art.

As shown in FIG. 11, in order to mount a connector clip 105 to a connecting portion between the pipe 1 and the resin tube 3, first, the broader portion 139 of the second slot 127 in the second receiving portion 119 is fitted onto the curved portion 57 of the pipe 1. Then, the connector clip 105 is pushed in a direction as indicated by an arrow, so that the cylindrical sealing portion 17 of the connector 5 is received in the U-shaped slot 123 in the fitting portion 113 of the holder portion 107, that an opposite end portion or end of the straight pipe portion 55 extending axially from the annular projection 53 is received in the first slot 125 of the first receiving portion 117 with a width slightly smaller than an outer diameter of the pipe 1 or the straight pipe portion 55, that the curved portion 57 and the root portion of the extending portion 59 of the pipe 1 are received in the grip portion 141 of the second slot 127 continued to the first slot 125, that the extending portion 59 of the pipe 1 is received in the broader portion 139, and that a length of the connector 5 and the pipe 1 from the tubular holder portion 15 to the annular projection 53 of the straight pipe portion 55 is located or held in the holding portion 115. As the C-shaped clamp 111, different from the C-shaped clamp 67, has an opening into a front direction or transversely of an longitudinal direction, the C-shaped clamp 111 is fitted on and engaged with the resin tube 3 at the same time. In this way, the connector clip 105 is completely mounted onto the connector 5 and the pipe 1, or a connecting portion of piping. When the connector 5 and the resin tube 3 are rotated around an axis of the connector 5 or the pipe inserting portion 7, the connector clip 105 also would entirely rotate along therewith by mounting the C-shaped clamp 111 onto the resin tube 3. If the C-shaped clamp 111 is formed to provide sufficient engagement with the resin tube 3, a precise co-rotatable function or a rotation restraint function can be expected therebetween. Further, the connector clip 105 is connected to both the connector 5 and the pipe 1 in co-rotatable relation with each other and prevents relative rotational movement of the connector 5 with respect to the pipe 1. Because the curved portion 57 of the pipe 1 (including the root portion of the extending portion 59) is received in the grip portion 141 of the second slot 127 wherein the reinforcing rib 143 is provided to enhance a resistance to widening deformation or movement, the extending portion 59 of the pipe 1 is received in the broader portion 139 of the second slot 127 wherein the reinforcing rib 143 is provided to enhance a resistance to widening deformation or movement, and then the second receiving portion 119 is connected to the pipe 1 co-rotatable relation therewith.

In case that the pipe 1 is not completely inserted and fitted in the connector 5, more specifically in the case that the annular engagement projection 43 of the pipe 1 does not engage in the engagement slits 49, 49 of the retainer 33, or in the case that the stopper portions 39, 39 of the retainer 33 are not seated and engaged in the engagement windows 23, 23 formed in the arcuate portions 21, 21 of the tubular holder portion 15 of the connector 5, that is, in the case of incomplete connection, as the annular projection 53 of the pipe 1 is located away from the tubular holder portion 15 of the connector 5 compared to the case of connection made completely, the annular projection 53 of the pipe 1 is not located so as to be received in the holding portion 115 or the projection receiving portion 159 thereof. However, the width of the first slot 125 of the first receiving portion 117 is formed sufficiently smaller than an outer diameter of the annular projection 53, as is the case with the connector clip 61, and a resistance to widening deformation or movement of the first slot 125 is sufficiently enhanced by the reinforcing ribs 131, 131. Therefore, the annular projection 53 cannot be received in the first slot 125 of the first receiving portion 117, and as a result, the holder portion 107 cannot be mounted onto the connecting portion in the piping (refer to FIG. 7 showing the connector clip 61). Hence, it can be verified whether the pipe 1 is connected to the connector 5 without fail.

I claim:

1. A connector clip for verifying connection between a connector for a fluid path and a pipe inserted in and snap-engaged with the connector, the connector having a tube connecting portion on one axial end thereof, and a pipe inserting portion on an opposite axial end thereof, the pipe having a straight pipe portion inserted into an opening on one end of the pipe inserting portion the pipe extending axially outwardly from the opening, a curved portion formed on an opposite axial end of the straight pipe portion, and an annular projection formed on an outer peripheral surface of the straight pipe portion, and located axially outwardly from the opening, the straight pipe portion being sealed by a sealing member with respect to an inner surface of the pipe inserting portion of the connector, the connector clip integrally comprising:

a mounting portion including a holding portion for holding therein a length of the connector and the pipe from the pipe inserting portion to the annular projection on the straight pipe portion and a straight pipe receiving portion formed on an end of the holding portion and adapted to fit on and receive a portion of the straight pipe portion extending axially from the annular projection the straight pipe receiving portion being constructed not to fit on and receive the annular projection, a connector connecting portion in engagement with the tube connecting portion of the connector or with a tube connected to the tube connecting portion and a pipe connecting portion receiving the curved portion of the pipe therein the connector connecting portion thus preventing relative rotation between the connector and the pipe.

2. The connector clip as set forth in claim 1 wherein:

the straight pipe receiving portion has a longitudinally extending straight pipe portion slot for fitting on and receiving a portion of the straight pipe portion extending axially from the annular projection, and the straight pipe portion slot is formed with a width sized smaller than an outer diameter of the annular projection of the pipe.

3. The connector clip as set forth in claim 2 wherein:

the pipe connecting portion is formed integrally with the straight pipe receiving portion, and has a curved portion slot continuous with the straight pipe portion slot for fitting on and receiving the curved portion of the pipe to prevent relative rotation between the connector and the pipe.

4. The connector clip as set forth in claim 2 wherein: the straight pipe receiving portion is provided integrally with one or a plurality of reinforcing ribs extending in a circumferential direction around an outer surface thereof for enhancing resistance to widening deformation of the straight pipe portion slot.

\* \* \* \* \*